(12) United States Patent
Miyano et al.

(10) Patent No.: US 11,236,823 B2
(45) Date of Patent: Feb. 1, 2022

(54) SHIFT RANGE CONTROL DEVICE

(71) Applicant: DENSO CORPORATION, Kariya (JP)

(72) Inventors: Haruka Miyano, Kariya (JP); Kouji Sakaguchi, Kariya (JP); Jun Yamada, Kariya (JP); Seiji Nakayama, Kariya (JP)

(73) Assignee: DENSO CORPORATION, Kariya (JP)

( * ) Notice: Subject to any disclaimer, the term of this patent is extended or adjusted under 35 U.S.C. 154(b) by 33 days.

(21) Appl. No.: 16/894,138

(22) Filed: Jun. 5, 2020

(65) Prior Publication Data

US 2020/0386307 A1    Dec. 10, 2020

(30) Foreign Application Priority Data

Jun. 10, 2019 (JP) .............................. JP2019-107712

(51) Int. Cl.
*F16H 61/32* (2006.01)

(52) U.S. Cl.
CPC ....... *F16H 61/32* (2013.01); *F16H 2061/326* (2013.01); *F16H 2342/02* (2013.01)

(58) Field of Classification Search
CPC .............. F16H 61/32; F16H 2061/326; F16H 2342/02; F16H 59/72
See application file for complete search history.

(56) References Cited

U.S. PATENT DOCUMENTS

| | | | |
|---|---|---|---|
| 2005/0174084 A1 | 8/2005 | Nakai et al. | |
| 2013/0144478 A1* | 6/2013 | Suzuki | B60L 15/20 701/22 |
| 2015/0160625 A1* | 6/2015 | Yoshida | H02P 29/0241 318/561 |
| 2015/0160631 A1* | 6/2015 | Yoshida | F16H 61/12 700/275 |
| 2015/0160640 A1* | 6/2015 | Yamada | H02P 29/027 318/635 |
| 2020/0325986 A1 | 10/2020 | Sakaguchi et al. | |

FOREIGN PATENT DOCUMENTS

JP    2018-179142    11/2018

* cited by examiner

*Primary Examiner* — Edwin A Young
(74) *Attorney, Agent, or Firm* — Nixon & Vanderhye P.C.

(57) ABSTRACT

A shift range control device for a shift range switching mechanism that is rotatably coupled with a shift actuator and includes a rotation member having multiple recesses and a locking portion rotationally positioning the rotation member by being locked to one of the multiple recesses, controls a motor of the shift actuator to switch a shift range. The shift range control device includes: an angle acquisition unit that acquires a rotation angle of an output shaft of the shift actuator; a valley position learning unit that performs valley position learning for learning, as a valley position, the rotation angle of the output shaft; and a temperature acquisition unit that acquires an environmental temperature.

13 Claims, 15 Drawing Sheets

| WORKING FLUID TEMPERATURE Ttm [°C] | -40 | 0 | 20 | 125 |
|---|---|---|---|---|
| DUTY RATIO D [%] | 20 | 30 | 40 | 40 |

| WORKING FLUID TEMPERATURE Ttm [°C] | -40 | 0 | 20 | 125 |
|---|---|---|---|---|
| TARGET ROTATION NUMBER Nmt [rpm] | 1000 | 1500 | 2000 | 2000 |

SHIFT RANGE CONTROL DEVICE

CROSS REFERENCE TO RELATED APPLICATION

The present application claims the benefit of priority from Japanese Patent Application No. 2019-107712 filed on Jun. 10, 2019. The entire disclosure of the above application is incorporated herein by reference.

TECHNICAL FIELD

The present disclosure relates to a shift range control device.

BACKGROUND

A shift range switching mechanism of an automatic transmission includes a rotation member and a locking member. A locking portion of the locking member is locked in a recess, and thereby the rotation member is rotationally positioned.

SUMMARY

A shift range control device for a shift range switching mechanism that may be rotatably coupled with a shift actuator and include a rotation member having multiple recesses and a locking portion rotationally positioning the rotation member by being locked to one of the multiple recesses, may control a motor of the shift actuator to switch a shift range. The shift range control device may include: an angle acquisition unit that may acquire a rotation angle of an output shaft of the shift actuator; a valley position learning unit that may perform valley position learning for learning, as a valley position, the rotation angle of the output shaft; and a temperature acquisition unit that may acquire an environmental temperature.

DETAILED DESCRIPTION

Figure 1:
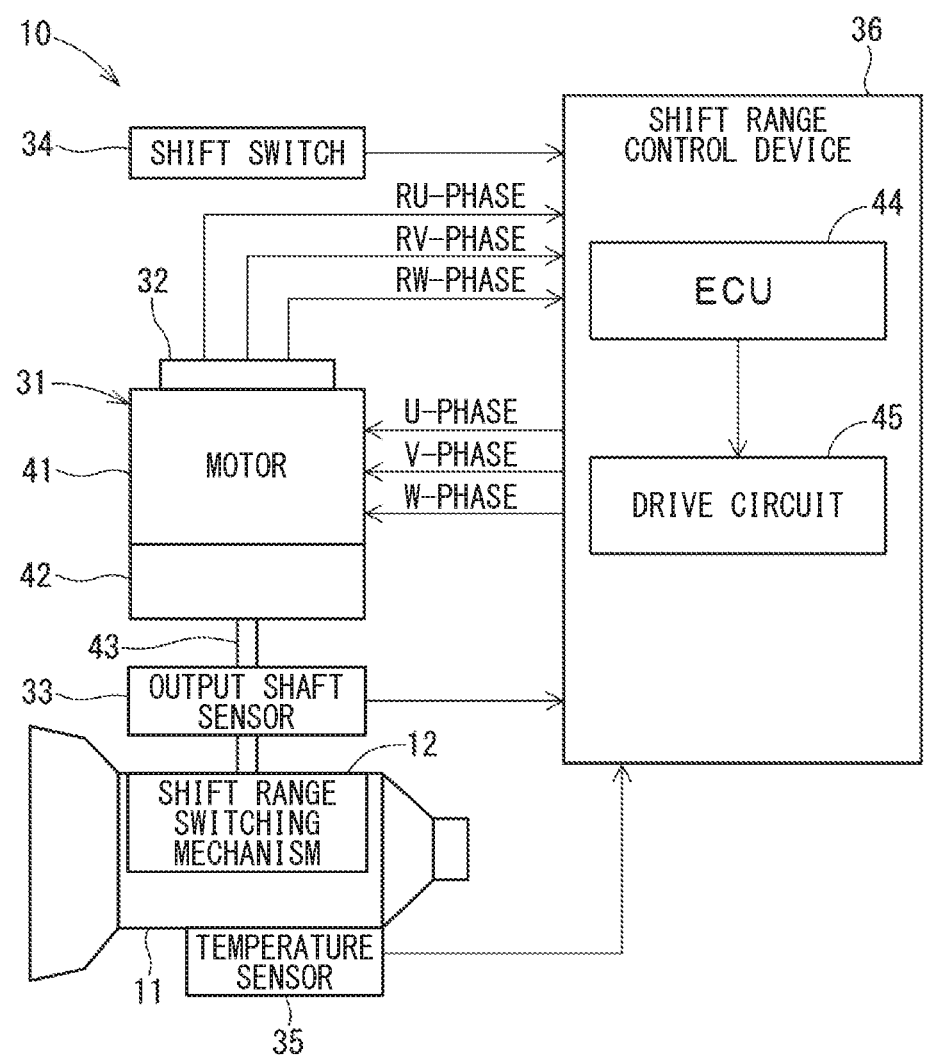
FIG. 1 is a diagram illustrating a shift-by-wire system to which a shift range control device in a first embodiment is applied.

A shift range switching mechanism of an automatic transmission includes a rotation member and a locking member. When the rotation member is rotated, a valve element position of a range switch valve of a hydraulic circuit is shifted. A shift range is switched according to the valve element position of the range switch valve. In an outer edge portion of the rotation member, multiple recesses corresponding to individual shift ranges are formed. A locking portion of the locking member is locked in a recess, and thereby the rotation member is rotationally positioned.

The rotation member has a shift actuator coupled with the rotation member such that rotation can be transferred. The shift actuator is controlled by a shift range control device. The shift range control device grasps a present shift range based on a detection value from a rotation angle sensor provided on an output shaft of the shift actuator and switches a shift range to a target shift range.

A rotation transmission system from a motor to the output shaft of the shift actuator has play. For this reason, when the locking portion approaches a recess for switching a shift range, the output shaft is moved ahead of the motor until a rotation angle (hereafter, referred to as a valley position) observed at a time when the locking portion is positioned at the valley bottom of the recess. When the output shaft is moved ahead of the motor as described above, a value of a rotation angle sensor of the output shaft is constant until the above-described play is packed. In a comparative example, a phenomenon that a value of the rotation angle sensor is constant is utilized to learn a valley position.

When valley position learning is performed in a low-temperature environment, a valley position can be erroneously learned. This is because in a low-temperature environment, a viscosity of working fluid is increased and a locking portion becomes less prone to fall to the valley bottom of a recess and thus time is taken for a section in which a value of the rotation angle sensor of the output shaft is constant to appear. If a valley position is erroneously learned, erroneous switching of a shift range or degradation in rotationally positioning the rotation member takes place when a shift range is switched.

One example of the present disclosure provides a shift range control device with improved accuracy in valley position learning.

According to one example, a shift range control device may be applied to a shift range switching mechanism rotatably coupled with a shift actuator and including a rotation member having multiple recesses and a locking portion rotationally positioning the rotation member by being locked to one of the multiple recesses and may control a motor of the shift actuator to switch a shift range. The shift range control device may include: an angle acquisition unit that may acquire a rotation angle of an output shaft of the shift actuator; a valley position learning unit that may perform valley position learning for learning, as a valley position, the rotation angle of the output shaft obtained when the locking portion is positioned at a valley bottom of the one of the multiple recesses based on a value acquired by the angle acquisition unit; and a temperature acquisition unit that may acquire an environmental temperature of the shift range switching mechanism.

According to one example embodiment, the shift range control device may further include a learning permission unit that may permit the valley position learning unit to perform the valley position learning when the environmental temperature is higher than a predetermined value and prohibit the valley position learning unit from performing the valley position learning when the environmental temperature is equal to the predetermined value or lower than the predetermined temperature. Thereby, the valley position learning is not performed in the low-temperature environment, and erroneous learning of the valley position is suppressed. Therefore, the accuracy in the valley position learning is improved.

According to another example embodiment, the shift range control device may further include a drive voltage-current correction unit that may reduce a drive voltage or a drive current of the motor with reduction in the environmental temperature during the valley position learning by the valley position learning unit.

Furthermore, according to another example embodiment, the shift range control device may further include a rotation number correction unit that may reduce a rotation number of the motor with reduction in the environmental temperature during the valley position learning by the valley position learning unit. Thereby, a duration from when the locking portion approaches the recess and the output shaft 43 can be moved ahead of the motor to when the locking portion is positioned at the valley bottom and play in the rotation transmission system is packed, is lengthened. Therefore, a section where a value of the rotation angle sensor of the output shaft is constant is sufficiently secured, and the valley position learning can be normally performed. The accuracy in the valley position learning is improved.

Hereafter, multiple embodiments of a shift range control device will be described with reference to the drawings. Among the embodiments, a substantially identical configuration will be marked with an identical reference numeral and a description of such a configuration will be omitted.

First Embodiment

A shift range control device in the first embodiment is applied to a shift-by-wire system 10 of a vehicle shown in FIG. 1. The shift-by-wire system 10 is a system that electrically controls a shift range switching mechanism 12 of an automatic transmission 11.

<Shift Range Switching Mechanism>

Figure 2:
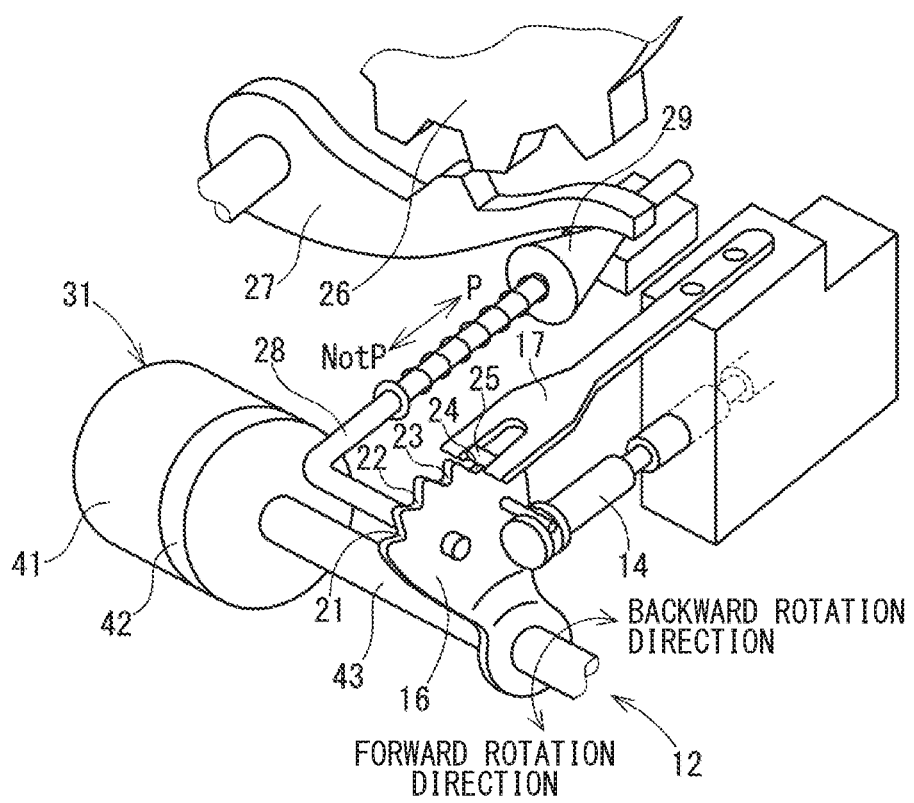
FIG. 2 is a perspective view of a shift range switching mechanism in FIG. 1.

The shift range switching mechanism 12 will be described with reference to FIG. 2. The shift range switching mechanism 12 includes a detent plate 16 and a detent spring 17. The detent plate 16 changes a valve element position of a range switch valve 14 of a hydraulic circuit for shift according to a rotational position. A shift range is switched according to a valve element position of the range switch valve 14. In the outer edge portion of the detent plate 16, multiple recesses 21 to 24 corresponding to individual shift ranges are formed.

The detent spring 17 is pressed against the detent plate 16 by own energizing force of the detent spring. A locking portion 25 of the detent spring 17 rotationally positions the detent plate 16 by being engaged with any of the recesses 21 to 24. The recesses 21 to 24 and the detent spring 17 configure a positioning part of the detent plate 16. When predetermined or higher turning force is applied to the detent plate 16 and the detent spring 17 is elastically deformed, the locking portion 25 is disengaged from a recess and can be relatively moved between the recesses 21 to 24. The recesses 21 to 24 respectively correspond to parking range, reverse range, neutral range, and drive range.

The shift range switching mechanism 12 further includes a park gear 26, a park pole 27, and a park rod 28 constituting a mechanism for parking lock. The park gear 26 is provided integrally with an output shaft of the automatic transmission 11. The park pole 27 can be brought closer to and away from the park gear 26 and locks rotation of the output shaft of the automatic transmission 11 by being engaged with the park gear 26. The park rod 28 is coupled with the detent plate 16. When the rotational position of the detent plate 16 corresponds to parking range, the park rod 28 squeezes a conical body 29 at the tip of the rod into under the park pole 27 to push up the park pole 27 and engages the park pole 27 and the park gear 26 with each other.

<Shift-by-Wire System>

The shift-by-wire system 10 will be described with reference to FIG. 1. As shown in FIG. 1, the shift-by-wire system 10 includes a shift actuator 31, an encoder 32, an output shaft sensor 33, a shift switch 34, a temperature sensor 35, and a shift range control device 36.

The shift actuator 31 is a rotary electric actuator that outputs rotation power and includes a motor 41 and a speed reducer 42. The speed reducer 42 decelerates rotation of the motor 41 and outputs the decelerated rotation from an output shaft 43. The output shaft 43 is connected to the detent plate 16 (refer to FIG. 2) of the shift range switching mechanism 12.

The encoder 32 is a sensor that detects a rotation angle of a rotor of the motor 41 and outputs pulse signals in multiple phases to the shift range control device 36 in synchronization with rotation of the rotor.

The output shaft sensor 33 is a sensor that detects a rotation angle of the output shaft 43 and outputs a signal corresponding to a rotation angle of the output shaft 43 to the shift range control device 36. Output signals from the output shaft sensor 33 are used to grasp a present shift range and calculate a rotation number of the output shaft 43, or the like purposes.

The shift switch 34 is a switch operated by a driver of the vehicle and outputs a signal corresponding a requested shift range from a driver. Hereafter, a driver's requested shift range may be also referred to as a "target shift range."

The temperature sensor 35 is a sensor that detects a working fluid temperature of the automatic transmission 11 and outputs a signal corresponding to the working fluid temperature to the shift range control device 36. In the first embodiment, the working fluid temperature is a value indicating an environmental temperature of the shift range switching mechanism 12.

The shift range control device 36 includes an ECU 44 configured based on a microcomputer and a drive circuit 45 including an inverter. The ECU 44 outputs command signals for driving the motor 41 according to output signals from the encoder 32, the output shaft sensor 33, the shift switch 34, and a vehicle speed sensor (not shown) or the like. The drive circuit 45 switches energization states of the coils in multiple phases of the motor 41 according to a command signal from the ECU 44.

<Function of ECU (1)>

Figure 3:
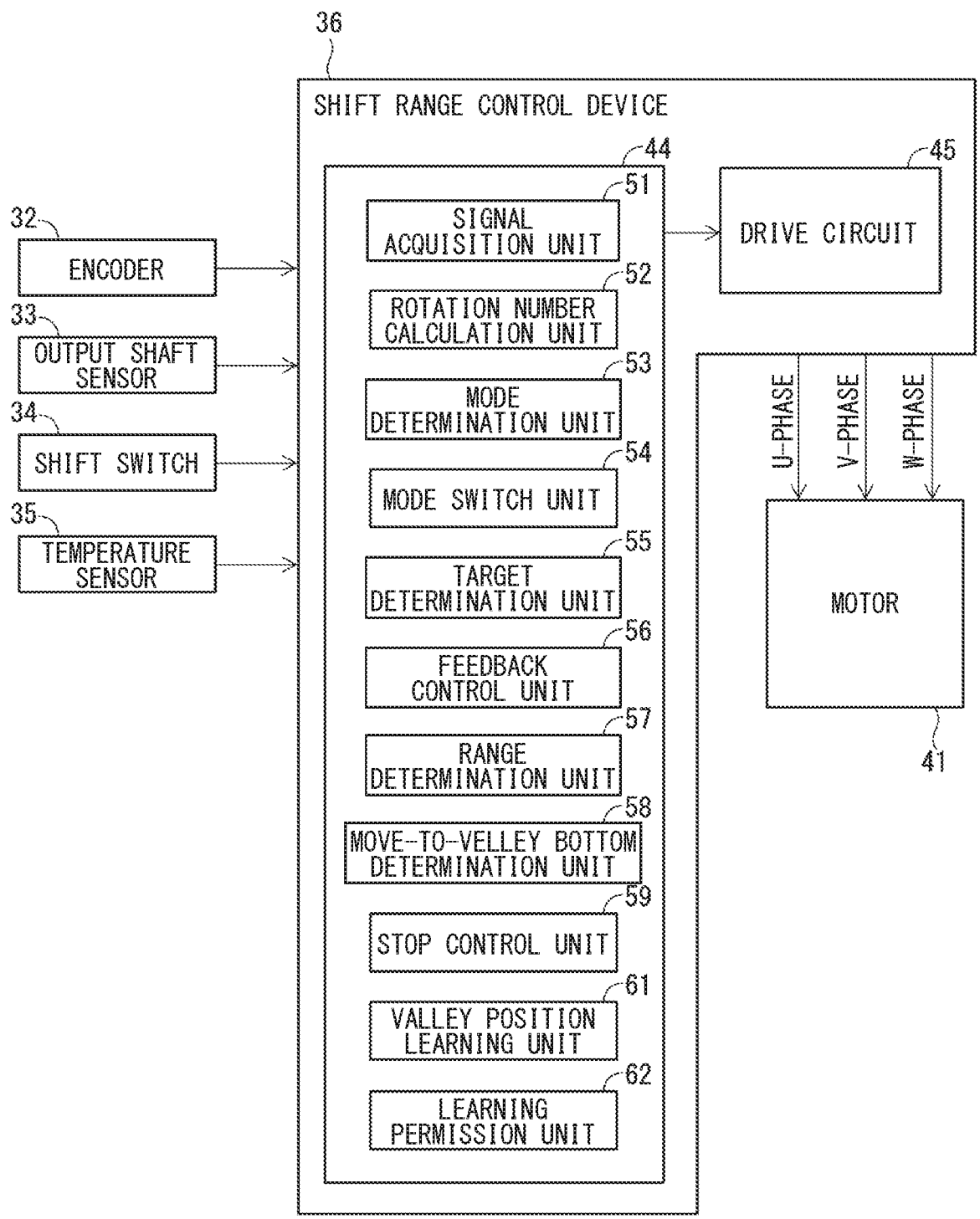
FIG. 3 is a diagram illustrating a function part provided in an ECU of the shift range control device in FIG. 1.

The ECU 44 of the shift range control device 36 will be described with reference to FIG. 3. First, the function of switching shift ranges by the ECU 44 will be described. The ECU 44 includes a signal acquisition unit 51 that acquires output signals from various sensors and a rotation number calculation unit 52. The rotation number calculation unit 52 calculates a rotation number (hereafter, referred to as output shaft rotation number No) of the output shaft 43 based on an output signal from the output shaft sensor 33 and calculates a rotation number (hereafter, referred to as motor rotation number Nm) of the motor 41 based on an output signal from the encoder 32.

The drive modes of the motor 41 selected by the ECU 44 include standby mode, feedback control mode, and stop control mode. The ECU 44 includes a mode determination unit 53 that determines which of the above-described drive modes is presently established and a mode switch unit 54 that switches drive modes. When the ECU 44 is initialized, the drive mode is set to the standby mode.

The ECU 44 includes a target determination unit 55 as a function part corresponding to the standby mode. The target determination unit 55 determines whether a target shift range has been changed from a present shift range based on an output signal from the shift switch 34. The mode switch unit 54 switches the drive mode to feedback control mode when a target shift range is changed from a present shift range.

The ECU 44 includes a feedback control unit 56, a range determination unit 57, and a move-to-valley bottom determination unit 58 as a function part corresponding to the feedback control mode. The feedback control unit 56 sets a target rotation angle of the motor 41 corresponding to a target shift range and rotationally drives the motor 41 by feedback control based on a rotation angle and a motor rotation number of the motor 41.

The range determination unit 57 determines in which of multiple range determination scopes the output shaft 43 is positioned based on an output signal from the output shaft sensor 33. The range determination scopes include a P range determination scope, a R range determination scope, a N range determination scope, and a D range determination scope. The P range determination scope is set as a range within which the locking portion 25 is positioned in the recess 21. The R range determination scope is set as a range within which the locking portion 25 is positioned in the recess 22. The N range determination scope is set as a range within which the locking portion 25 is positioned in the recess 23. The D range determination scope is set as a range within which the locking portion 25 is positioned in the recess 24.

Hereafter, a range determination scope within which the output shaft 43 is determined to be positioned may be also referred to as a "present range determination scope." A range determination scope within which a target shift range is established may be also referred to as a "target range determination scope".

The move-to-valley bottom determination unit 58 determines that the locking portion 25 has been relatively moved to the valley bottom of a recess corresponding to a present range determination scope among the recesses 21 to 24 based on change in output shaft rotation number No during shift range switching. In the first embodiment, the move-to-valley bottom determination unit 58 determines that the locking portion 25 has been relatively moved to the valley bottom of the recess when the output shaft rotation number No becomes equal to a predetermined value N1 or lower than that during the shift range switching.

The move-to-valley bottom determination unit 58 determines that the locking portion 25 has moved to the valley bottom of a recess corresponding to a target range determination scope among the recesses 21 to 24 when a present range determination scope coincides with a target range determination scope and the output shaft rotation number No becomes equal to a predetermined value N1 or lower than that during the shift range switching. That is, in the above-described case, the move-to-valley bottom determination unit 58 determines that the locking portion 25 has moved to the valley bottom of the recess corresponding to the target shift range. The mode switch unit 54 switches the drive mode to the stop control mode when the locking portion 25 is determined to have moved to the valley bottom of the recess corresponding to the target shift range.

The ECU 44 includes a stop control unit 59 as a function part corresponding to the stop control mode. The stop control unit 59 stops rotation of the motor 41 and further determines whether the rotation stop has been completed.

Rotation of the detent plate 16 and the output shaft 43 during the shift range switching will be described. During the shift range switching, the locking portion 25 goes over a peak between a pair of recesses and then is accelerated as if the locking portion were sucked into the valley bottom of a recess. As a result, rotation numbers of the detent plate 16 and the output shaft 43 are significantly increased as compared with a rotation number of the motor 41. For this reason, when the locking portion 25 is moved to the valley bottom of a recess, the detent plate 16 and the output shaft 43 are positioned on the valley bottom side of the recess ahead of the rotor of the motor 41 by an amount equivalent to play provided in the rotation transmission system from the rotor to the output shaft 43 of the motor 41. Therefore, while the play is packed, the detent plate 16 or the output shaft 43 is not rotated even though the motor 41 is rotated.

The stop control unit 59 stops rotation of the motor 41 before the above-described play is packed after the locking portion 25 moved to the valley bottom of a recess corresponding to a target shift range. The mode switch unit 54 switches the drive mode to the standby mode when rotation stop of the motor 41 is determined to have been completed.

<Processing Performed by ECU (1)>

A series of processing performed by the ECU 44 to switch a shift range will be described with reference to FIG. 4. A routine shown in FIG. 4 is repeatedly performed after the ECU 44 is started.

Figure 4:
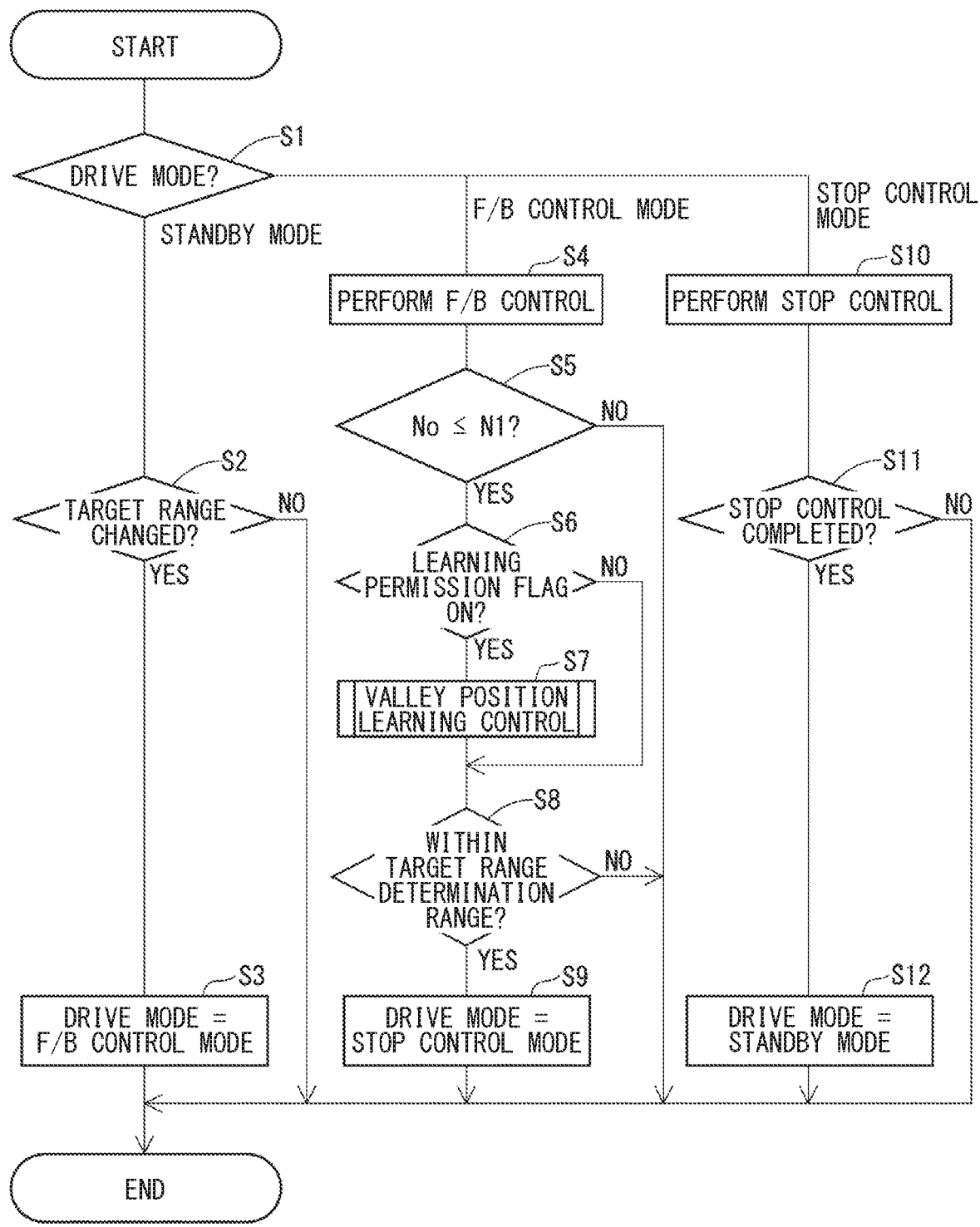
FIG. 4 is a flowchart explaining processing performed by the ECU in FIG. 3 to switch a shift range.

When the routine shown in FIG. 4 is started, at S1, which drive mode of the standby mode, feedback control mode, and the stop control mode is presently established is determined. When the drive mode is the standby mode, the processing proceeds to S2. When the drive mode is feedback control mode, the processing proceeds to S4. When the drive mode is the stop control mode, the processing proceeds to S10.

At S2, whether a target shift range has been changed from a present shift range is determined. When the target shift range has been changed (S2: YES), the processing proceeds to S3. When the target shift range has not been changed (S2: NO), the processing exits from the routine shown in FIG. 4.

At S3, the drive mode is changed to feedback control mode. Subsequent to S3, the processing exits from the routine shown in FIG. 4.

At S4, feedback control is performed. When feedback control is performed for the first time, a target count value is set on the encoder based on an output signal from the output shaft sensor 33 and the motor 41 is rotationally driven by feedback control based on an actual count value and a motor rotation number Nm. When feedback control has already been being performed, the feedback control is continued. Subsequent to S4, the processing proceeds to S5.

At S5, whether the output shaft rotation number No has become equal to a predetermined value N1 or lower than that is determined. When the output shaft rotation number No has become equal to the predetermined value N1 or lower than that (S5: YES), the processing proceeds to S6. When the output shaft rotation number No has not become equal to the predetermined value N1 or lower than that (S5: NO), the processing exits from the routine shown in FIG. 4.

At S6, whether a flag (hereafter, referred to as a learning permission flag) permitting the performance of valley position learning is ON is determined. The valley position refers to a rotation angle of the output shaft 43 obtained when the locking portion 25 is positioned at the valley bottom of any of the recesses 21 to 24. The valley position learning will be described in detail together with the details of the next S7. When the learning permission flag is ON (S6: YES), the processing proceeds to S7. When the learning permission flag is OFF (S6: NO), the processing proceeds to S8.

At S7, valley position learning control is performed. Subsequent to S7, the processing proceeds to S8.

At S8, whether the output shaft 43 is positioned within a target range determination scope is determined based on an output signal from the output shaft sensor 33. When the output shaft 43 is positioned within the target range determination scope (S8: YES), the processing proceeds to S9. When the output shaft 43 is not positioned within the target range determination scope (S8: NO), the processing exits from the routine shown in FIG. 4.

At S9, the drive mode is changed to the stop control mode. Subsequent to S9, the processing exits from the routine shown in FIG. 4.

At S10, stop control is performed to stop rotation of the motor 41. Subsequent to S10, the processing proceeds to S11.

At S11, whether rotation stop control on the motor 41 has been completed. When the stop control has been completed (S11: YES), the processing proceeds to S12. When the stop control has not been completed (S11: NO), the processing exits from the routine shown in FIG. 4.

At S12, the drive mode is changed to the standby mode. Subsequent to S12, the processing exits from the routine shown in FIG. 4.

<Concrete Example of Operation>

An example of operation of the ECU 44 will be described with reference to FIG. 5 and FIG. 6. This example shows operation performed in a case where a present shift range is parking range and a target shift range is changed to the drive range and further the working fluid temperature of the automatic transmission 11 is higher than a predetermined value.

Figure 5:
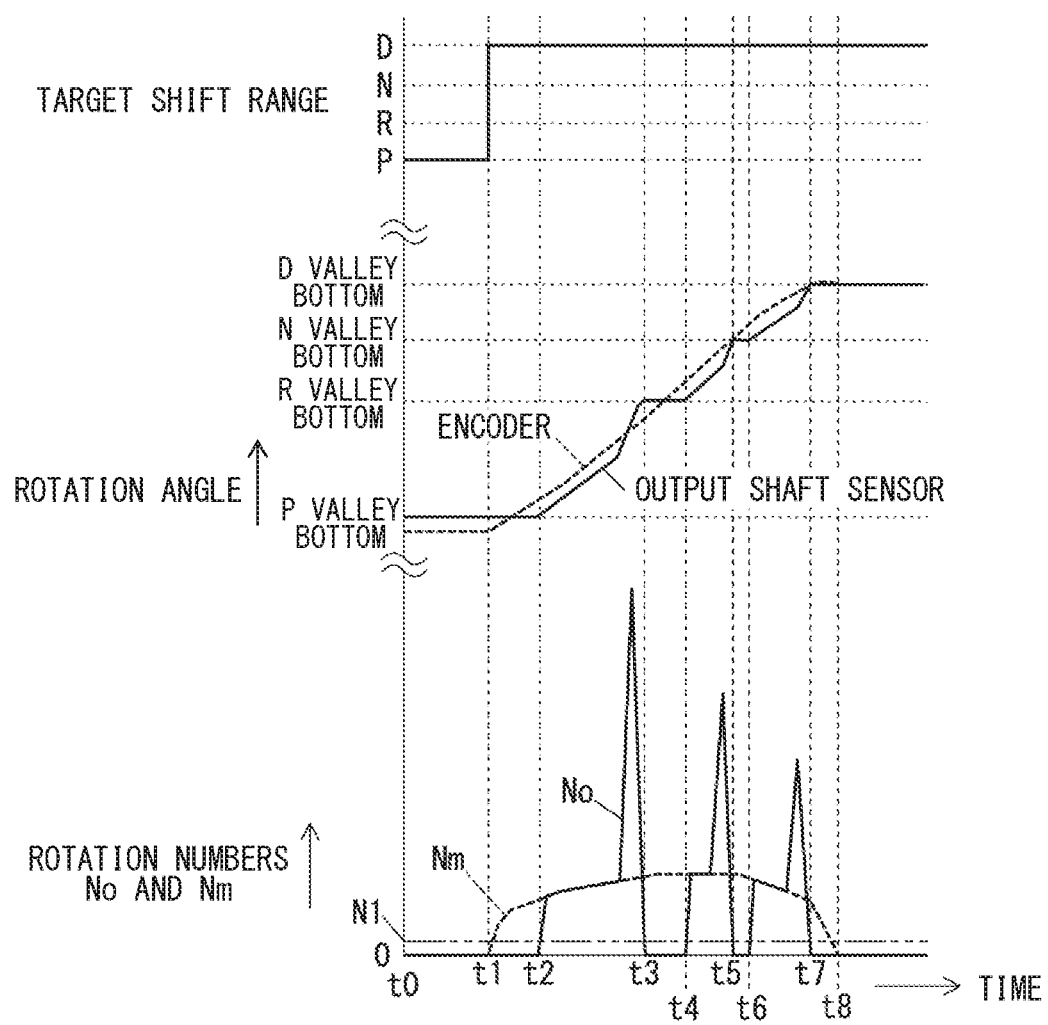
FIG. 5 is a time chart that indicates a transition of various values during shift range switching by the ECU in FIG. 3 and illustrates an example of operation performed when a working fluid temperature of an automatic transmission is higher than a predetermined value.
Figure 6:
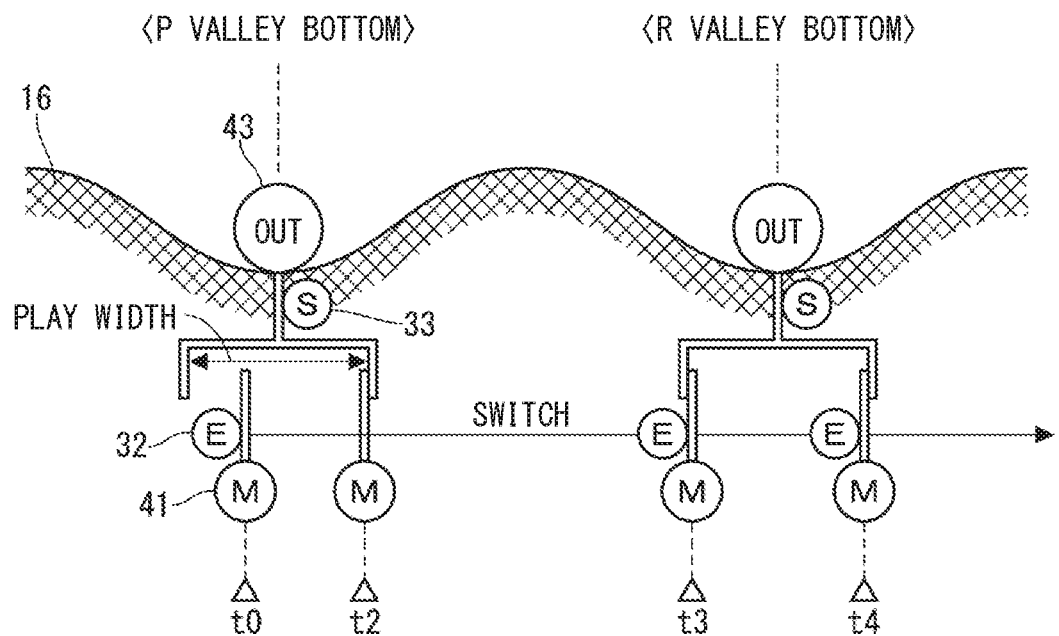
FIG. 6 is a schematic diagram illustrating play in a rotation transmission system from a motor to an output shaft of a shift actuator in FIG. 1.

In FIG. 5, the output shaft rotation number No of the vertical axis is plotted after conversion to motor rotation number Nm. That is, in FIG. 5, [Nm] and [No×α] are indicated in an overlapped manner based on a motor rotation number [Nm] and an output shaft rotation number [No×α] whose respective scales are matched with each other using a reduction ratio α from the motor 41 to the output shaft 43.

Hereafter, comparison of an output shaft rotation number No and a motor rotation number Nm is on the assumption that the respective scales matched with each other are used. In these cases, the respective rotation numbers will be described as "motor rotation number Nm" and "output shaft rotation number No" and a description of reduction ratio α will be omitted. This is also the case with descriptions in drawings. A description of "Nm−No" means a difference between rotation numbers whose respective scales are matched with each other. A description of "respective scales are matched with each other" applies not only to a case of [Nm] and [No×α] and is also applicable to a case of [Nm/α] and [No] without problems.

In the following description, "P valley bottom", "R valley bottom", "N valley bottom", and "D valley bottom" respectively refer to the valley bottoms of the recesses 21, 22, 23, and 24.

As indicated in FIG. 5, at time t0 before start of the shift range switching, both a motor rotation number Nm and an output shaft rotation number No are 0. The locking portion 25 of the detent spring 17 is positioned at the P valley bottom and the output shaft 43 is also at a corresponding rotation angle. Meanwhile, the rotor of the motor 41 is positioned within play provided in the rotation transmission system from the rotor to the output shaft 43. As shown in FIG. 6, at time to, the play is not packed.

At time t1 in FIG. 5, a target shift range is changed to the drive range and shift range switching is started. At t1, at S2 in FIG. 4, the determination is positive and the drive mode is changed to feedback control mode.

During a period from time t1 to time t2 in FIG. 5, the motor 41 is rotated but the output shaft 43 is not rotated because the play is not packed.

At t2 in FIG. 5, the play is packed. Immediately after that, rotation of the output shaft 43 is started. As shown in FIG. 6, at time t2, the play is packed.

During a first half of a period from time t2 to time t3 in FIG. 5, that is, before the locking portion 25 goes over the peak between the recess 21 and the recess 22, the output shaft rotation number No follows a motor rotation number Nm.

During a second half of a period from time t2 to time t3 in FIG. 5, that is, after the locking portion 25 went over the peak between the recess 21 and the recess 22, the detent plate 16 is rotated such that the locking portion 25 falls down to the valley bottom of the recess 22 and the output shaft rotation number No is increased. As a result, the output shaft 43 is moved ahead of the motor 41 by an amount equivalent to the play.

At time t3 in FIG. 5, the locking portion 25 substantially moves to the R valley bottom and the output shaft rotation number No becomes equal to the predetermined value N1 or lower than that. At time t3, as shown in FIG. 6, the output shaft 43 is ahead of the motor 41 by the amount equivalent to the play and has substantially moved to a rotation angle corresponding to the R valley bottom. At time t3, at S5 in FIG. 4, the determination is positive and then the valley position learning control is performed. This time, a target range determination scope is D range determination scope and a present range determination scope does not coincide with the target range determination scope. Therefore, at S8 in FIG. 4, the determination is negative.

During a period from time t3 to time t4 in FIG. 5, the motor 41 is rotated but the output shaft 43 is not rotated because the play is not packed.

During a period from time t4 to t7 in FIG. 5, the same operation as during a period from time t2 to t4 is performed.

At time t7 in FIG. 5, a present range determination scope coincides with the target range determination scope. Therefore, at S8 in FIG. 4, the determination is positive and the drive mode is changed to the stop control mode.

After time t7 in FIG. 5, the stop control is performed. Due to the completion of stop control at time t8, at S12 in FIG. 4, the drive mode is changed to the standby mode.

<Function of ECU (2)>

Figure 7:
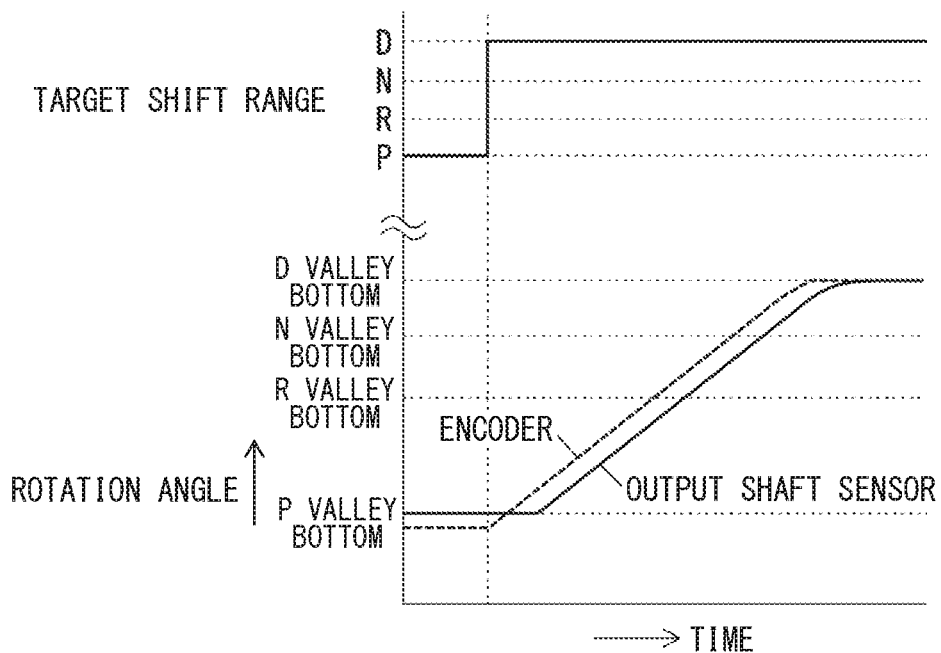
FIG. 7 is a time chart indicating an example of operation performed when the working fluid temperature of an automatic transmission is higher than a predetermined value in a comparative embodiment.

A valley position learning function of the ECU 44 will be described. FIG. 5 illustrates an example of operation performed when the working fluid temperature of the automatic transmission 11 is higher than a predetermined value in the first embodiment. Meanwhile, FIG. 7 illustrates an example of operation performed when a working fluid temperature Ttm of the automatic transmission 11 is equal to a predetermined value T1 or lower than that in a comparative embodiment. In a low-temperature environment, the viscosity of working fluid is increased and the locking portion 25 becomes less prone to fall down to the valley bottom of the recess, For this reason, as indicated in FIG. 7, the output shaft 43 is not rotated ahead of the motor 41 and the output shaft rotation number No follows the motor rotation number Nm. As a result, relative movement of the locking portion 25 to the valley bottom of the recess cannot be determined based on change in the output shaft rotation number No. Therefore, when the valley position learning is performed in a low-temperature environment, there is a possibility that a valley position is erroneously learned. A low-temperature of the low-temperature environment is, for example, about 0° C.

In addition to a function part for the valley position learning, the ECU 44 includes a function part for suppressing the above-described erroneous learning of a valley position. Specifically, as illustrated in FIG. 3, the ECU 44 includes a valley position learning unit 61 and a learning permission unit 62.

The signal acquisition unit 51 includes an angle acquisition unit that acquires a rotation angle (hereafter, referred to as output shaft rotation angle θo) of the output shaft 43 and a temperature acquisition unit that acquires the working fluid temperature Ttm of the automatic transmission 11.

The valley position learning unit 61 learns, as a valley position, an output shaft rotation angle θo obtained when the locking portion 25 is positioned at the valley bottom of the recess based on an acquired value of the signal acquisition unit 51. Specifically, when the move-to-valley bottom determination unit 58 determines that the locking portion 25 has been relatively moved to the valley bottom of the recess, the valley position learning unit 61 learns an output shaft rotation angle θo at that time as a valley position.

The learning permission unit 62 permits the valley position learning unit 61 to perform the valley position learning when the working fluid temperature Ttm is higher than a predetermined value T1 and prohibits the valley position learning unit 61 from performing valley position learning when the working fluid temperature Ttm is equal to the predetermined value T1 or lower than that. Specifically, the learning permission unit 62 sets a learning permission flag to ON when the working fluid temperature Ttm is higher than the predetermined value T1 and sets the learning permission flag to OFF when the working fluid temperature Ttm is equal to the predetermined value T1 or lower than that.

The predetermined value T1 is preset as a lower limit value of a temperature range within which a section with a constant output shaft rotation angle θo appears when switching a shift range while rotationally driving the motor 41 at a target rotation number.

<Processing Performed by ECU (2)>

A series of processing performed by the ECU 44 for the valley position learning will be described with reference to FIG. 4, FIG. 8, and FIG. 9.

Figure 8:
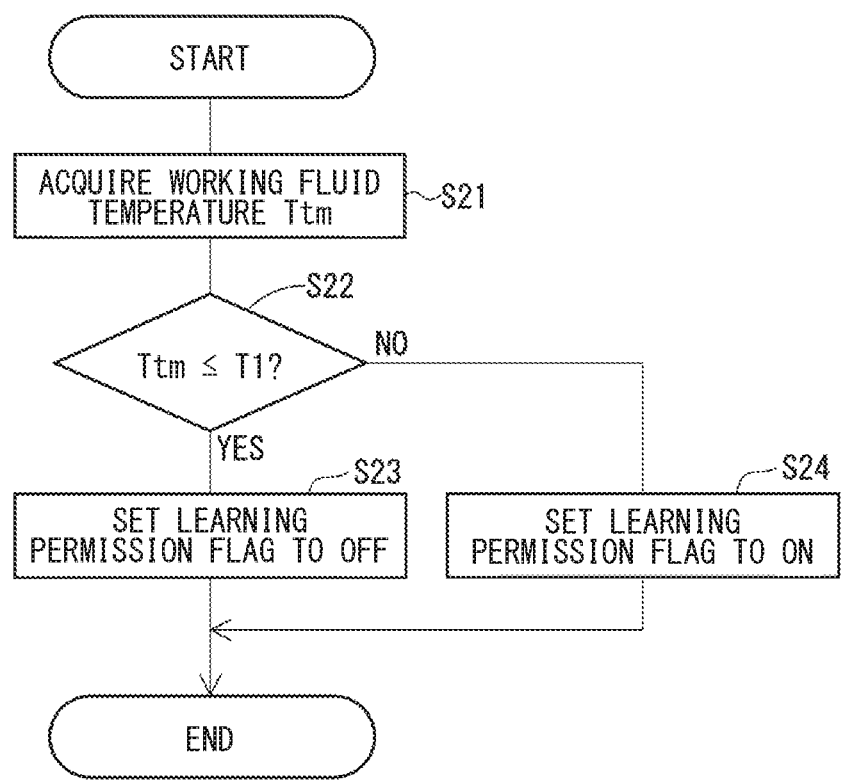
FIG. 8 is a flowchart illustrating processing performed by the ECU in FIG. 3 to set a learning permission flag.

A routine shown in FIG. 8 is performed for setting a learning permission flag used at S6 in FIG. 4 and is repeatedly performed after the ECU 44 is started.

When the routine shown in FIG. 8 is started, at S21, the working fluid temperature Ttm of the automatic transmission 11 is acquired. Subsequent to S21, the processing proceeds to S22.

At S22, whether the working fluid temperature Ttm is equal to a predetermined value T1 or lower than that is determined. When the working fluid temperature Ttm is equal to the predetermined value T1 or lower than that (S22: YES), the processing proceeds to S23. When the working fluid temperature Ttm is higher than the predetermined value T1 (S22: NO), the processing proceeds to S24.

At S23, the learning permission flag is set to OFF. Subsequent to S23, the processing exits from the routine shown in FIG. 8.

At S24, the learning permission flag is set to ON. Subsequent to S24, the processing exits from the routine shown in FIG. 8.

Figure 9:
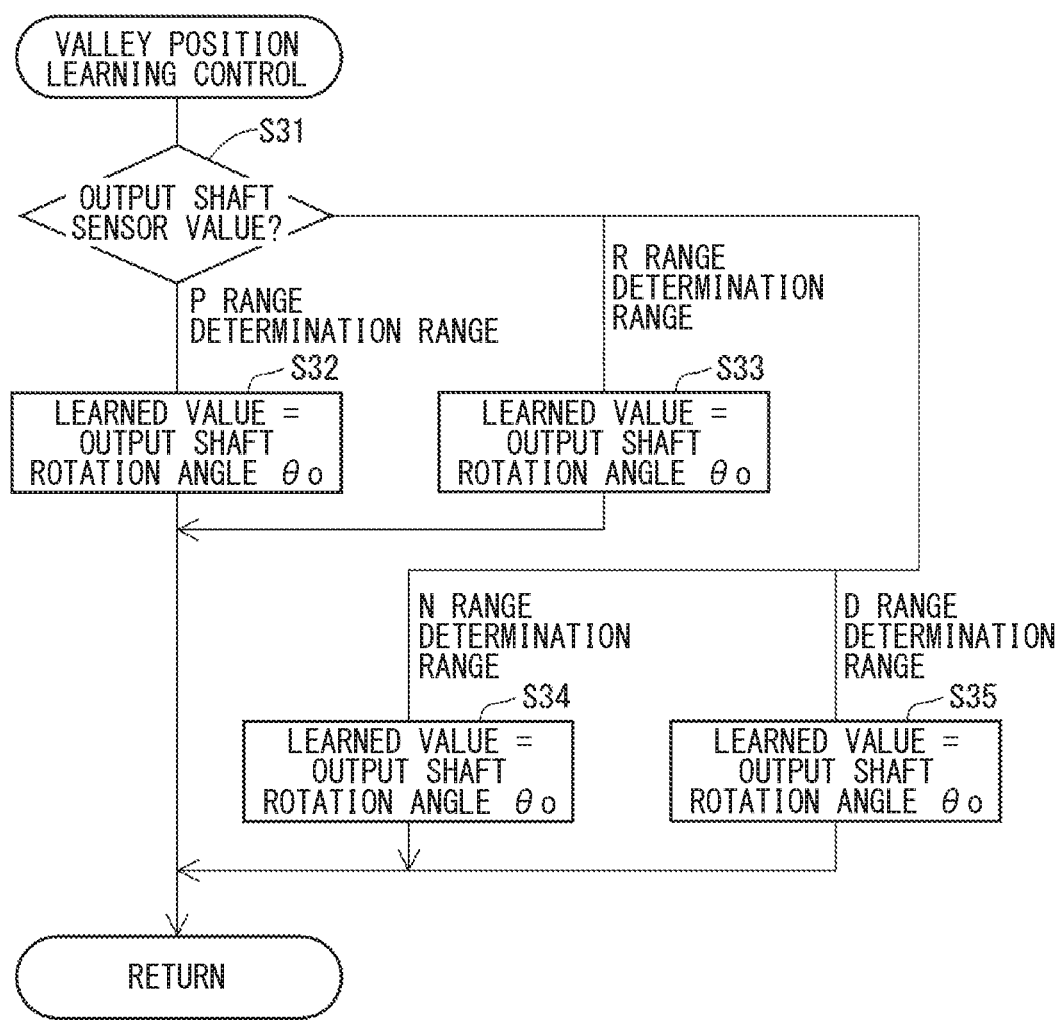
FIG. 9 is a sub-flowchart illustrating processing performed by the ECU in FIG. 3.

At S7 in FIG. 4, a subroutine for the valley position learning control shown in FIG. 9 is invoked and performed. The operation at S7 is performed, for example, when a valley position learning value is not present, when a predetermined period has elapsed after the previous valley position learning, or on other like occasions.

When the subroutine shown in FIG. 9 is started, at S31, at which of multiple range determination scopes the output shaft 43 is positioned is determined. That is, which range determination scope is a present range determination scope is determined. When the present range determination scope is the P range determination scope, the processing proceeds to S32. When the present range determination scope is the R range determination scope, the processing proceeds to S33. When the present range determination scope is the N range determination scope, the processing proceeds to S34. When the present range determination scope is the D range determination scope, the processing proceeds to S35.

At S32, the present output shaft rotation angle θo is learned as P valley position. Subsequent to S32, the processing returns to the routine shown in FIG. 4.

At S33, the present output shaft rotation angle θo is learned as R valley position.

Subsequent to S33, the processing returns to the routine shown in FIG. 4.

At S34, the present output shaft rotation angle θo is learned as N valley position. Subsequent to S34, the processing returns to the routine shown in FIG. 4.

At S35, the present output shaft rotation angle θo is learned as D valley position. Subsequent to S35, the processing returns to the routine shown in FIG. 4.

<Effect>

As described above, in the first embodiment, the shift range control device 36 includes the valley position learning unit 61 and the learning permission unit 62. The valley position learning unit 61 learns, as a valley position, the output shaft rotation angle θo obtained when the locking portion 25 is positioned at the valley bottom of the recess based on an acquired value of the signal acquisition unit 51. The learning permission unit 62 permits the valley position learning unit 61 to perform the valley position learning when the working fluid temperature Ttm is higher than the predetermined value T1 and prohibits the valley position learning unit 61 from performing valley position learning when the working fluid temperature Ttm is equal to the predetermined value T1 or lower than that. As a result, in the low-temperature environment, the valley position learning is not performed and erroneous learning of the valley position is suppressed; therefore, the accuracy in the valley position learning is improved.

In the first embodiment, the working fluid temperature Ttm of the automatic transmission 11 provided with the shift range switching mechanism 12 is used as an environmental temperature of the shift range switching mechanism 12 for determining permissibility of the valley position learning. As a result, whether the shift range switching mechanism is in a low-temperature environment in which the locking portion 25 is less prone to fall down to the valley bottom of the recess can be directly determined.

Second Embodiment

Figure 10:
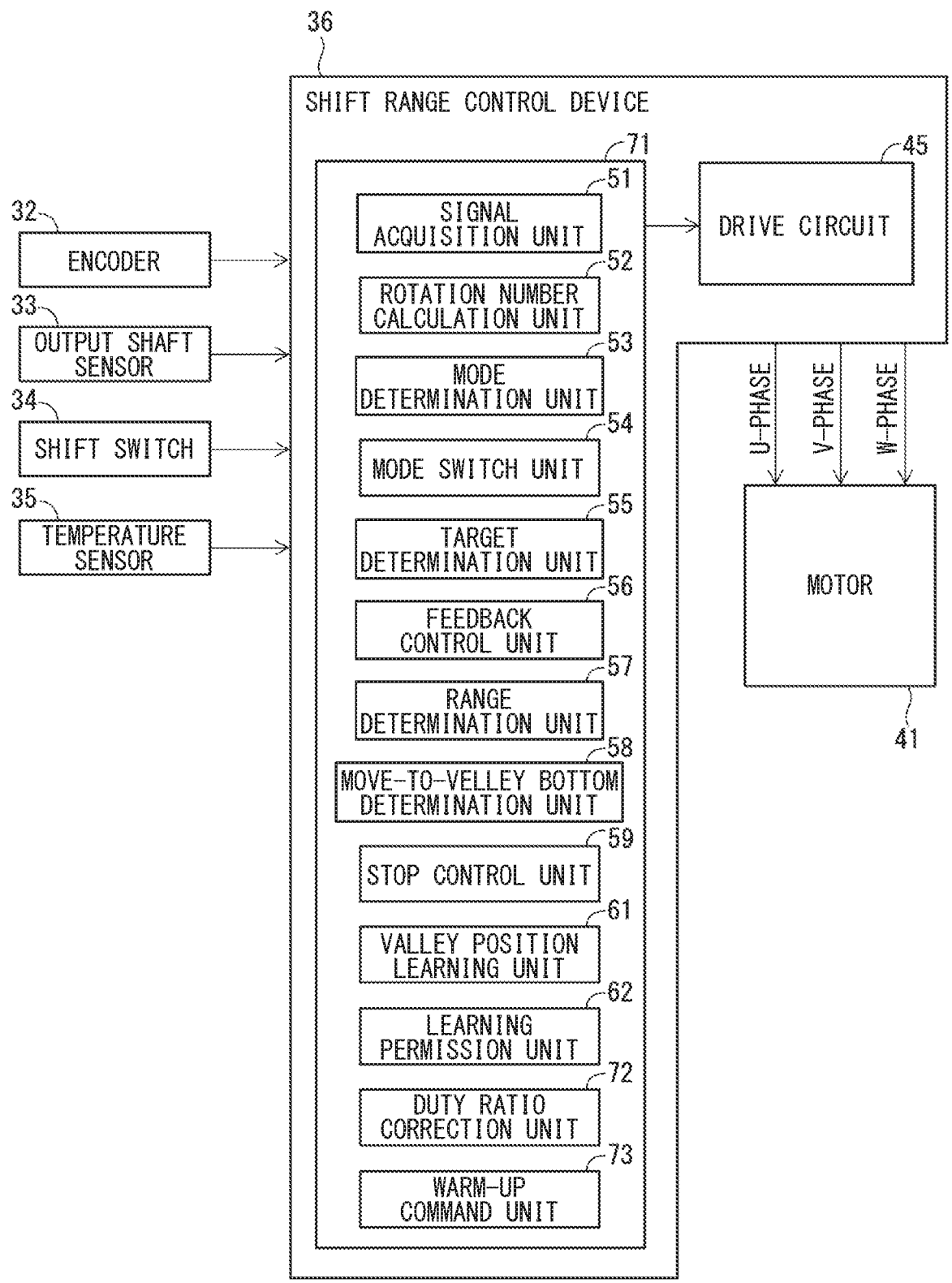
FIG. 10 is a diagram illustrating a function part provided in an ECU of a shift range control device in a second embodiment.

In the second embodiment, as illustrated in FIG. 10, ECU 71 includes a duty ratio correction unit 72 as a drive voltage-current correction unit and a warm-up command unit 73. The duty ratio correction unit 72 reduces a duty ratio D of a drive current of the motor 41 with reduction in the working fluid temperature Ttm during valley position learning by the valley position learning unit 61. The duty ratio D is set according to the working fluid temperature Ttm based on a map shown in FIG. 11 and is used in place of the duty ratio calculated at a non-valley position learning time. In the map shown in FIG. 11, the duty ratio D is intermittently varied in multiple stages. The numerical values in the map shown in FIG. 11 are examples and other numerical values may be set in other embodiments.

When the working fluid temperature Ttm is equal to a predetermined cryogenic temperature value T2 or lower than that, the warm-up command unit 73 commands an engine control unit, not shown, to perform warming up of the vehicle mounted with the shift range switching mechanism 12. The cryogenic temperature value T2 is, for example, about −20° C. At −20° C., the viscosity of the working fluid becomes significantly high.

Figures 11, 12:
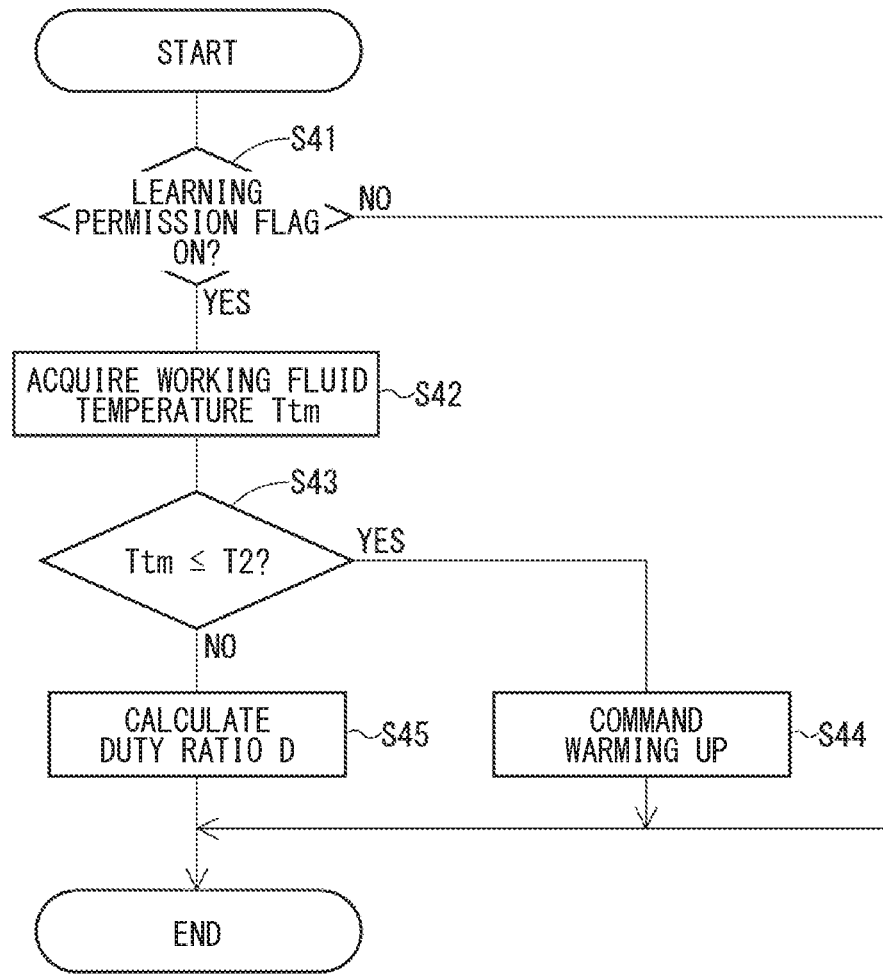
FIG. 11 is a table showing a map used by the ECU in FIG. 10 to calculate a duty ratio.
FIG. 12 is a flowchart illustrating processing performed by the ECU in FIG. 10.

A routine for the valley position learning shown in FIG. 12 is repeatedly performed after the ECU 71 is started. When the routine shown in FIG. 12 is started, at S41, whether the learning permission flag is ON is determined. When the learning permission flag is ON (S41: YES), the processing proceeds to S42. When the learning permission flag is OFF (S41: NO), the processing exits form the routine shown in FIG. 12.

At S42, the working fluid temperature Ttm of the automatic transmission 11 is acquired. Subsequent to S42, the processing proceeds to S43.

At S43, whether the working fluid temperature Ttm is equal to the cryogenic temperature value T2 or lower than that is determined. When the working fluid temperature Ttm is equal to the cryogenic temperature value T2 or lower than that (S43: YES), the processing proceeds to S44. When the working fluid temperature Ttm is higher than the cryogenic temperature value T2 (S43: NO), the processing proceeds to S45.

At S44, the engine control unit is commanded to perform warming up of the vehicle. Subsequent to S44, the processing exits from the routine shown in FIG. 12.

At S45, the duty ratio D is calculated according to the working fluid temperature Ttm using the map. A duty ratio D is set to a lower value with reduction in the working fluid temperature Ttm. Subsequent to S45, the processing exits from the routine shown in FIG. 12.

Figure 13:
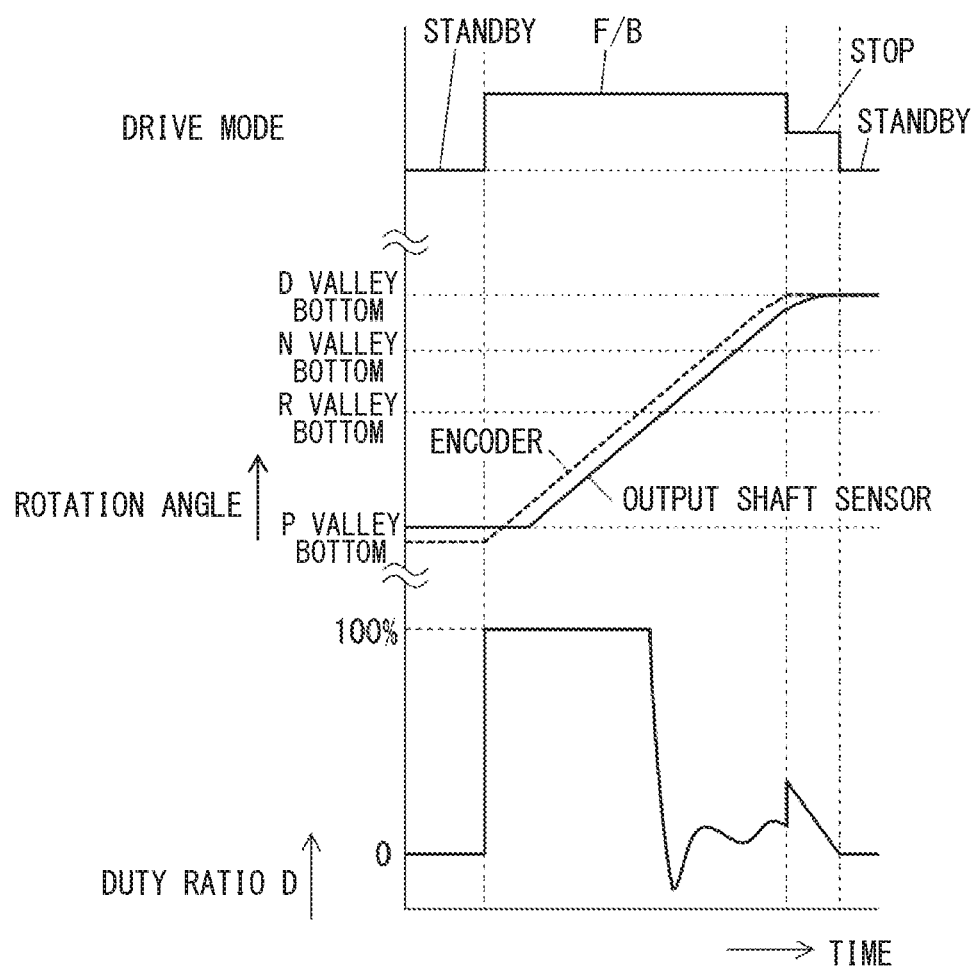
FIG. 13 is a time chart indicating an example of operation performed when a duty ratio is set to 100% in a low-temperature environment in a comparative embodiment.

In a comparative embodiment indicated in FIG. 13, the duty ratio D is set to 100% despite in a low-temperature environment. For this reason, the motor 41 is rotated relatively fast and even when the locking portion 25 approaches the recess, the output shaft 43 is not rotated ahead of the motor 41 and the output shaft rotation number No follows the motor rotation number Nm.

Figure 14:
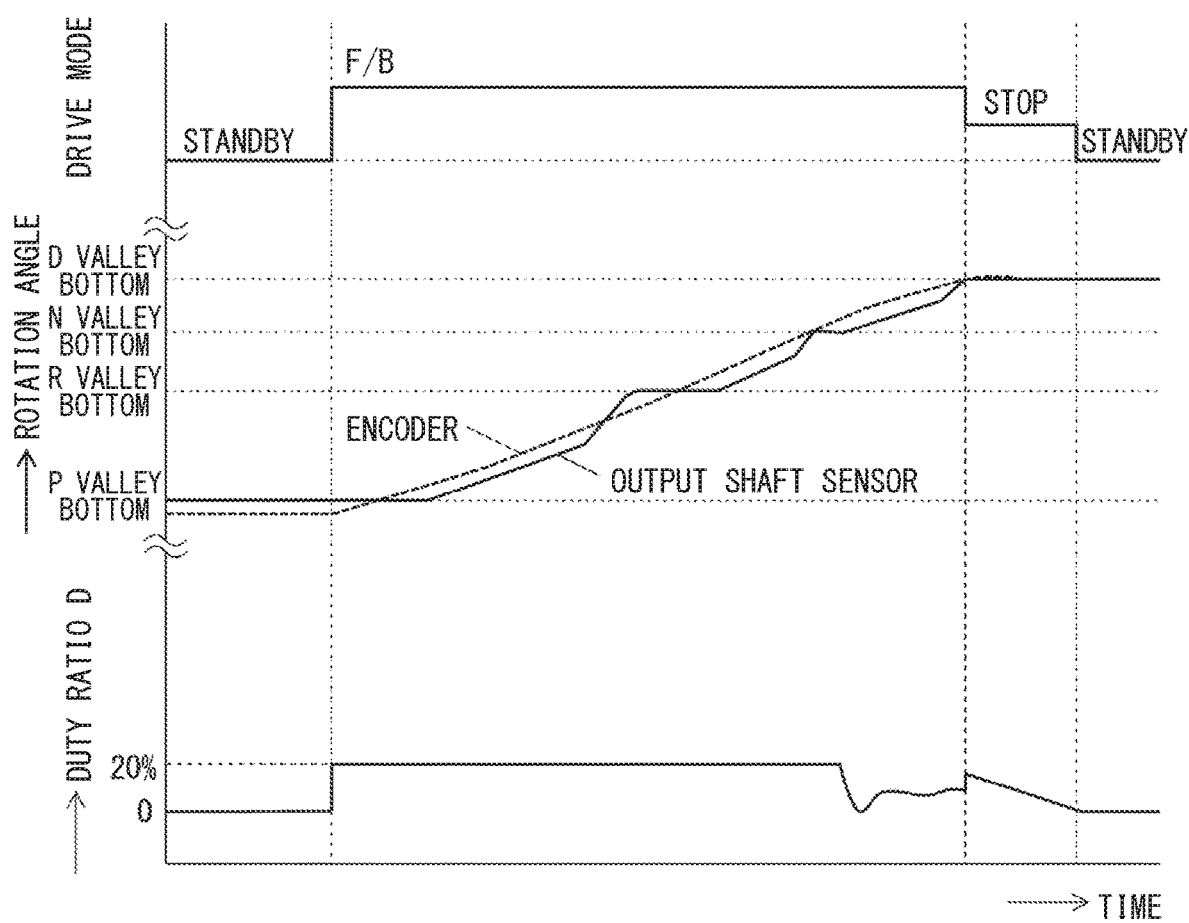
FIG. 14 is a time chart indicating a transition of various values during the shift range switching by the ECU in FIG. 10 in a low-temperature environment.

In the second embodiment, the duty ratio correction unit 72 reduces a duty ratio D of the drive current of the motor 41 with reduction in the working fluid temperature Ttm during the valley position learning by the valley position learning unit 61. For example, as indicated in FIG. 14, the duty ratio D is set to 20% in the low-temperature environment. As a result, the motor 41 is rotated relatively slowly and a duration from when the locking portion 25 approaches the recess and the output shaft 43 can be moved ahead of the motor 41 to when the locking portion 25 is positioned at the valley bottom and play in the rotation transmission system is packed, is lengthened. That is, a time margin for the locking portion 25 to fall down to the valley bottom is produced. For this reason, a sufficient section in which an output shaft rotation number No is constant can be ensured and the valley position learning can be normally performed and accuracy in the valley position learning is improved.

Third Embodiment

Figure 15:
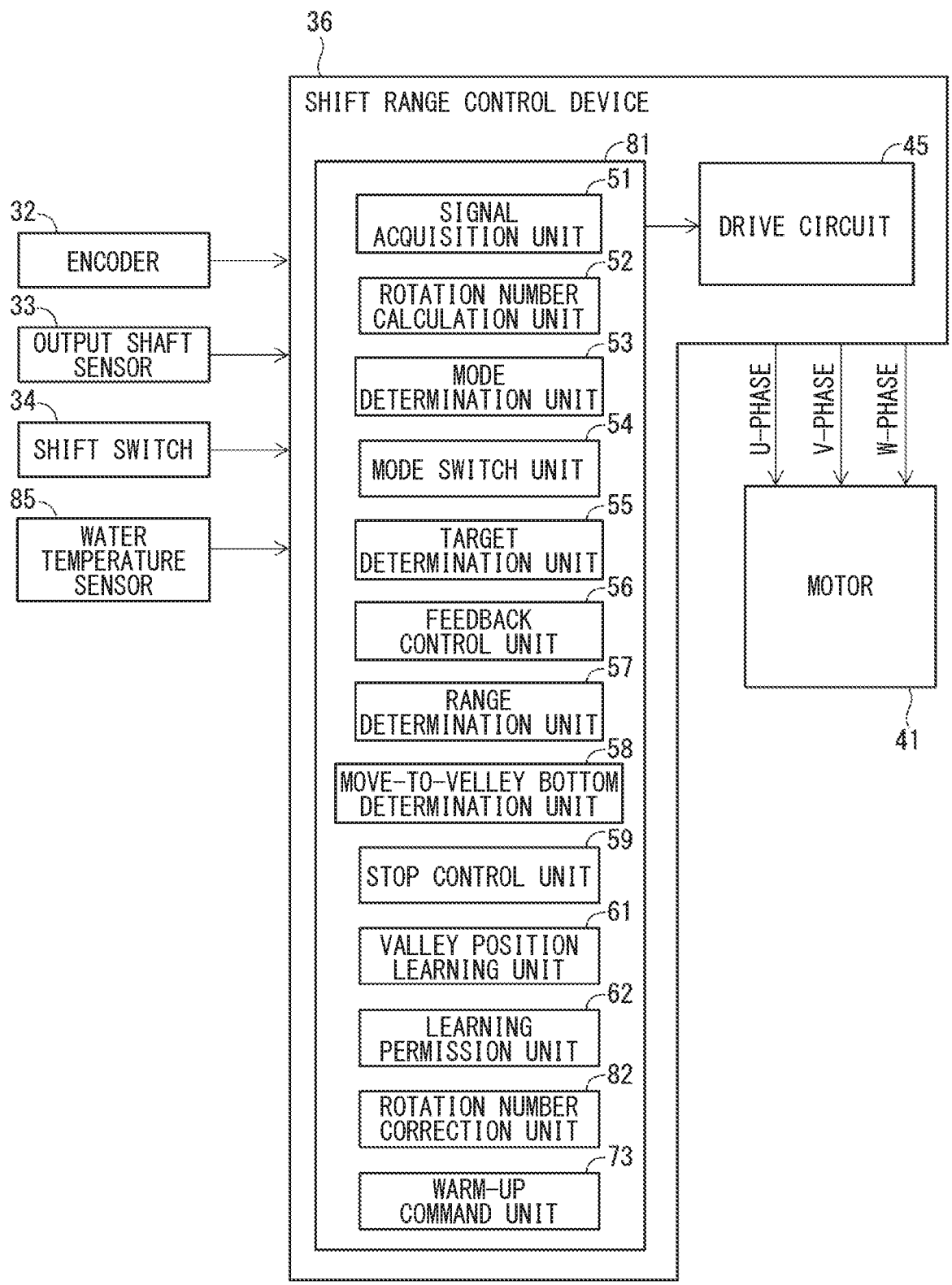
FIG. 15 is a diagram illustrating a function part provided in an ECU of a shift range control device in a third embodiment.

In the third embodiment, as shown in FIG. 15, the signal acquisition unit 51 acquires an output signal corresponding to a cooling water temperature from a water temperature sensor 85. A cooling water temperature is a temperature from which the working fluid temperature Ttm can be estimated and is a value indicating an environmental temperature of the shift range switching mechanism 12.

ECU 81 includes a rotation number correction unit 82 and the warm-up command unit 73. The rotation number correction unit 82 reduces a target rotation number Nmt of the motor 41 with reduction in cooling water temperature Tw during the valley position learning by the valley position learning unit 61. The target rotation number Nmt is set according to a cooling water temperature Tw using a map shown in FIG. 16. In the map shown in FIG. 16, the target rotation number Nmt is intermittently varied in multiple stages.

Processing performed by the ECU 81 to set the target rotation number Nmt is similar to processing performed by the ECU 71 to set the duty ratio D in the second embodiment. That is, the ECU 81 performs the processing shown in FIG. 12 with the duty ratio D replaced with the target rotation number Nmt.

Figures 16, 17:
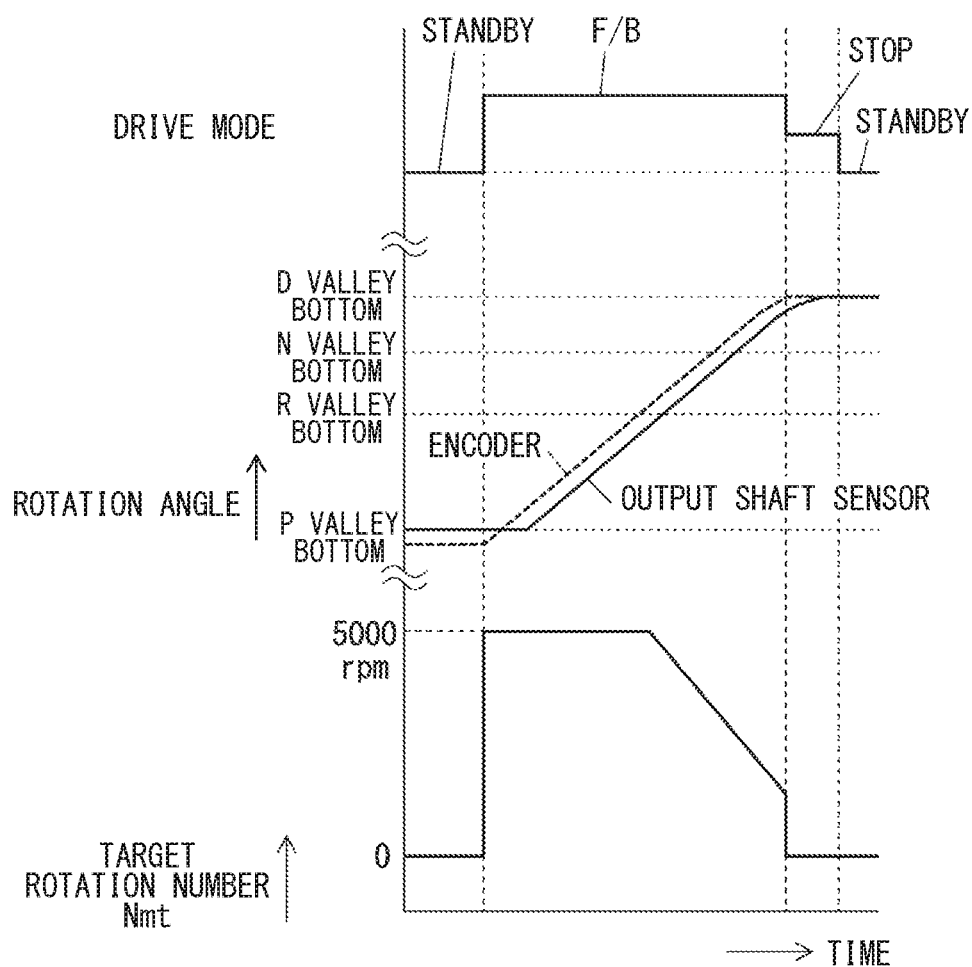
FIG. 16 is a table showing a map used by the ECU in FIG. 15 to calculate a target rotation number of a motor.
FIG. 17 is a time chart indicating an example of operation performed when a target rotation number of a motor is set to a relatively high value in a low-temperature environment in a comparative embodiment.

In a comparative embodiment indicated in FIG. 17, the target rotation number Nmt is set to a relatively high value, 5000 rpm, despite in a low-temperature environment. For this reason, the motor 41 is rotated relatively fast and even when the locking portion 25 approaches the recess, the output shaft 43 is not rotated ahead of the motor 41 and the output shaft rotation number No follows a motor rotation number Nm.

Figure 18:
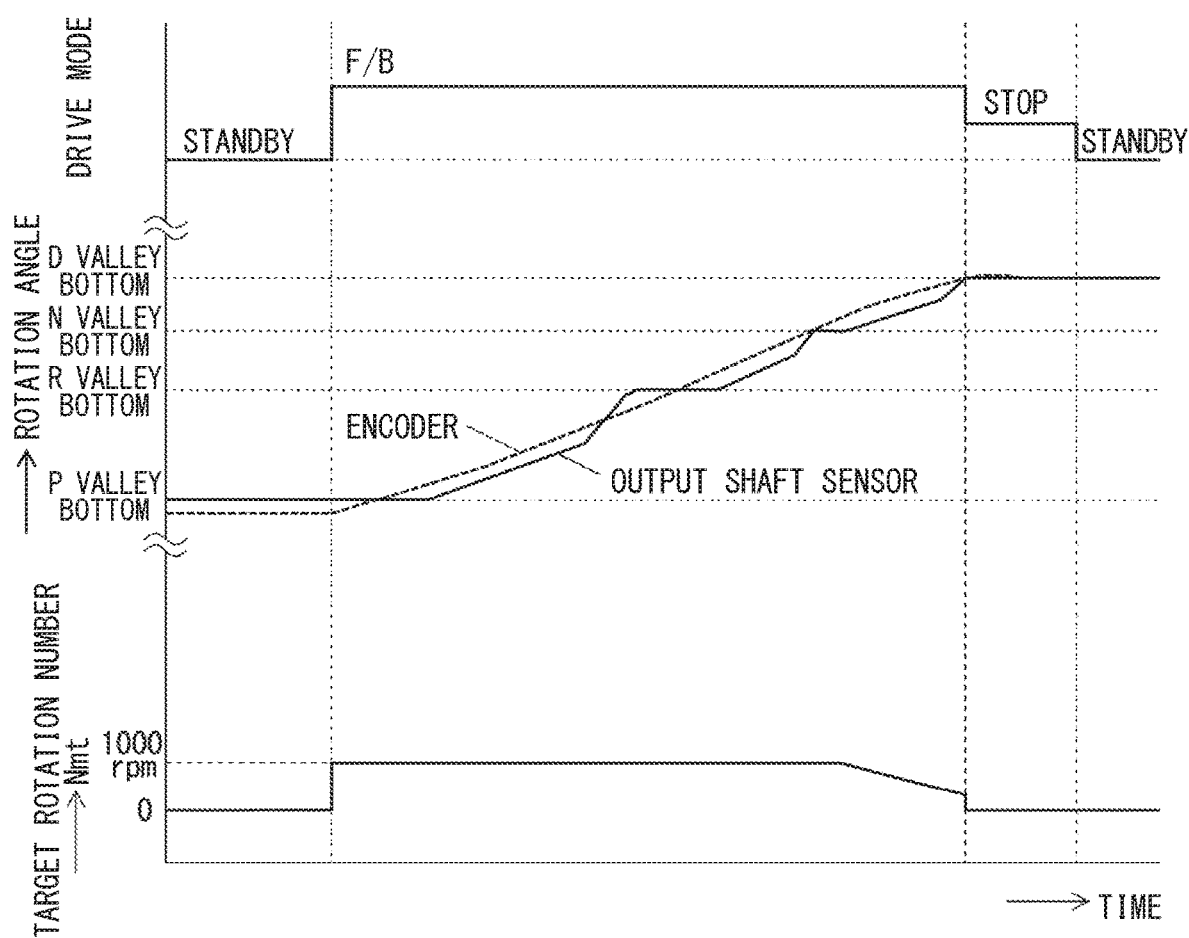
FIG. 18 is a time chart indicating a transition of various values during the shift range switching by the ECU in FIG. 15 in a low-temperature environment.

In the third embodiment, the rotation number correction unit 82 reduces the target rotation number Nmt of the motor 41 with reduction in cooling water temperature Tw during the valley position learning by the valley position learning unit 61. For example, as indicated in FIG. 18, the target rotation number Nmt is set to 1000 rpm in a low-temperature environment. As a result, the motor 41 is rotated relatively slowly. A duration from when the locking portion 25 approaches the recess and the output shaft 43 can be moved ahead of the motor 41 to when the locking portion 25 is positioned at the valley bottom and play in the rotation transmission system is packed, is lengthened. That is, a time margin for the locking portion 25 to fall down to a valley bottom is produced. For this reason, a sufficient section in which an output shaft rotation number No is constant can be ensured and the valley position learning can be normally performed and accuracy in the valley position learning is improved.

OTHER EMBODIMENTS

In other embodiments, a two-staged configuration may be adopted so that when the working fluid temperature is equal to a predetermined value or lower than that, a duty ratio (or a target rotation number) is reduced or a configuration in which a duty ratio (or a target rotation number) is continuously varied according to the working fluid temperature may be adopted.

In other embodiments, a different method may be used for the move-to-valley bottom determination unit to determine that the locking portion has been relatively moved to a recess bottom. For example, scales of a motor rotation number and an output shaft rotation number are matched with each other using a reduction ratio from the motor to the output shaft. When a difference between such motor rotation number and output shaft rotation number becomes equal to a predetermined value or above within a range in which an output shaft rotation number is smaller than a motor rotation number during the shift range switching, the locking portion may be determined to have been relatively moved to a recess bottom. Otherwise, when a predetermined time has passed after an output shaft rotation number became equal to a predetermined value or higher during the shift range switching, the locking portion may be determined to have been relatively moved to a recess bottom. The above-described predetermined value is set to an output shaft rotation number that cannot be reached by the own torque of the motor.

In other embodiments, the motor need not be rotationally driven by feedback control and may be rotationally driven by any other method, such as energization switching control in which an energization phase is successively switched according to a rotation angle.

In other embodiments, the detent plate may be provided with two, three, or five or more recesses. The shift range switching mechanism may accordingly have two, three, or five or more shift ranges to switch.

The control device and method described in the present disclosure may be implemented by a special purpose computer created by configuring a memory and a processor programmed to execute one or more particular functions embodied in computer programs. Alternatively, the control device and method described in the present disclosure may be implemented by a special purpose computer created by configuring a processor provided by one or more special purpose hardware logic circuits. Alternatively, the control device and method described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

Here, the process of the flowchart or the flowchart described in this application includes multiple sections (or steps), and each section is expressed as, for example, S1. Further, each section may be divided into several subsections, while several sections may be combined into one section. Furthermore, each section thus configured may be referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. A shift range control device for a shift range switching mechanism that is rotatably coupled with a shift actuator and includes a rotation member having a plurality of recesses and a locking portion rotationally positioning the rotation member by being locked to one of the plurality of recesses, the shift range control device configured to control a motor of the shift actuator to switch a shift range, the shift range control device comprising:
   an angle acquisition unit configured to acquire a rotation angle of an output shaft of the shift actuator;
   a valley position learning unit configured to perform valley position learning for learning, as a valley position, the rotation angle of the output shaft obtained when the locking portion is positioned at a valley bottom of the one of the plurality of recesses based on a value acquired by the angle acquisition unit;
   a temperature acquisition unit configured to acquire an environmental temperature of the shift range switching mechanism; and
   a learning permission unit configured to
      permit the valley position learning unit to perform the valley position learning when the environmental temperature is higher than a predetermined value and
      prohibit the valley position learning unit from performing the valley position learning when the environmental temperature is equal to the predetermined value or lower than the predetermined value.

2. The shift range control device according to claim 1, wherein:
   the environmental temperature is a working fluid temperature of a transmission provided with the shift range switching mechanism.

3. The shift range control device according to claim 1, wherein
   the environmental temperature is a temperature for estimating a working fluid temperature of a transmission provided with the shift range switching mechanism.

4. The shift range control device according to claim 1, further comprising:

a warm-up command unit configured to command warming up of a vehicle having the shift range switching mechanism when the environmental temperature is equal to a predetermined cryogenic temperature value or lower than the predetermined cryogenic temperature value.

5. The shift range control device according to claim 1, further comprising:
one or more processors corresponding to the angle acquisition unit, the valley position learning unit, and the temperature acquisition unit; and
a memory coupled to the one or more processors and storing program instructions that when executed by the one or more processors cause the one or more processors to at least:
  acquire the rotation angle of the output shaft of the shift actuator;
  perform valley position learning for learning, as the valley position, the rotation angle of the output shaft obtained when the locking portion is positioned at the valley bottom of the one of the plurality of recesses based on the acquired value;
  acquire the environmental temperature of the shift range switching mechanism;
  permit the valley position learning to be performed when the environmental temperature is higher than the predetermined value; and
prohibit the valley position learning from being performed when the environmental temperature is equal to the predetermined value or lower than the predetermined value.

6. A shift range control device for a shift range switching mechanism that is rotatably coupled with a shift actuator and includes a rotation member having a plurality of recesses and a locking portion rotationally positioning the rotation member by being locked to one of the plurality of recesses, the shift range control device configured to control a motor of the shift actuator to switch a shift range, the shift range control device comprising:
an angle acquisition unit configured to acquire a rotation angle of an output shaft of the shift actuator;
a valley position learning unit configured to perform valley position learning for learning, as a valley position, the rotation angle of the output shaft obtained when the locking portion is positioned at a valley bottom of the one of the plurality of recesses based on a value acquired by the angle acquisition unit;
a temperature acquisition unit configured to acquire an environmental temperature of the shift range switching mechanism; and
a drive voltage-current correction unit configured to reduce a drive voltage or a drive current of the motor with reduction in the environmental temperature during the valley position learning by the valley position learning unit.

7. The shift range control device according to claim 6, wherein:
the environmental temperature is a working fluid temperature of a transmission provided with the shift range switching mechanism.

8. The shift range control device according to claim 6, wherein
the environmental temperature is a temperature for estimating a working fluid temperature of a transmission provided with the shift range switching mechanism.

9. The shift range control device according to claim 6, further comprising:
a warm-up command unit configured to command warming up of a vehicle mounted with the shift range switching mechanism when the environmental temperature is equal to a predetermined cryogenic temperature value or lower than the predetermined cryogenic temperature value.

10. A shift range control device for a shift range switching mechanism that is rotatably coupled with a shift actuator and includes a rotation member having a plurality of recesses and a locking portion rotationally positioning the rotation member by being locked to one of the plurality of recesses, the shift range control device configured to control a motor of the shift actuator to switch a shift range, the shift range control device comprising:
an angle acquisition unit configured to acquire a rotation angle of an output shaft of the shift actuator;
a valley position learning unit configured to perform valley position learning for learning, as a valley position, the rotation angle of the output shaft obtained when the locking portion is positioned at a valley bottom of the one of the plurality of recesses based on a value acquired by the angle acquisition unit;
a temperature acquisition unit configured to acquire an environmental temperature of the shift range switching mechanism; and
a rotation number correction unit configured to reduce a rotation number of the motor with reduction in the environmental temperature during the valley position learning by the valley position learning unit.

11. The shift range control device according to claim 10, wherein:
the environmental temperature is a working fluid temperature of a transmission provided with the shift range switching mechanism.

12. The shift range control device according to claim 10, wherein
the environmental temperature is a temperature for estimating a working fluid temperature of a transmission provided with the shift range switching mechanism.

13. The shift range control device according to claim 10, further comprising:
a warm-up command unit configured to command warming up of a vehicle mounted with the shift range switching mechanism when the environmental temperature is equal to a predetermined cryogenic temperature value or lower than the predetermined cryogenic temperature value.

\* \* \* \* \*